US010876557B2

(12) United States Patent
Sisitsky et al.

(10) Patent No.: US 10,876,557 B2
(45) Date of Patent: Dec. 29, 2020

(54) CONTAINER CONNECTION SYSTEM

(71) Applicant: TAKIT, LLC, Rye, NY (US)

(72) Inventors: Aviva Warter Sisitsky, Rye, NY (US); Greg Mote, Big Bear Lake, CA (US)

(73) Assignee: TAKIT, LLC, Rye, NY (US)

( * ) Notice: Subject to any disclaimer, the term of this patent is extended or adjusted under 35 U.S.C. 154(b) by 0 days.

(21) Appl. No.: 16/654,864

(22) Filed: Oct. 16, 2019

(65) Prior Publication Data

US 2020/0124068 A1    Apr. 23, 2020

Related U.S. Application Data

(63) Continuation-in-part of application No. 16/163,364, filed on Oct. 17, 2018.

(51) Int. Cl.
*F16B 5/06* (2006.01)
(52) U.S. Cl.
CPC .................. *F16B 5/0621* (2013.01)
(58) Field of Classification Search
CPC .... F16B 21/065; F16B 5/0621; F16B 5/0642; F16B 5/0657
See application file for complete search history.

(56) References Cited

U.S. PATENT DOCUMENTS

| | | | | |
|---|---|---|---|---|
| 5,061,112 A | * | 10/1991 | Monford, Jr. | F16B 21/165 403/328 |
| 5,295,717 A | * | 3/1994 | Chen | F16L 37/18 285/312 |
| 5,368,343 A | * | 11/1994 | Allen | F16L 37/18 16/446 |
| 5,435,604 A | * | 7/1995 | Chen | F16L 37/18 285/312 |
| 5,568,946 A | * | 10/1996 | Jackowski | F16L 37/0987 285/38 |
| 5,816,623 A | * | 10/1998 | Chang | F16L 37/18 285/88 |
| 6,015,168 A | * | 1/2000 | Fahl | F16L 37/18 285/312 |

(Continued)

FOREIGN PATENT DOCUMENTS

| | | |
|---|---|---|
| JP | 2010108712 A | 5/2010 |
| WO | 9827374 A1 | 6/1998 |
| WO | 2018227243 A1 | 12/2018 |

*Primary Examiner* — Robert Sandy
*Assistant Examiner* — David M Upchurch
(74) *Attorney, Agent, or Firm* — Weitzman Law Offices, LLC

(57) ABSTRACT

A connector assembly for releasably connecting a first container to a second container, using male connector(s) and corresponding female connector(s) attached to each container, each female connector having a recess for receiving a portion of a male connector. The connectors transition to a releasably locked state by moving a locking member retractor to a position that reduces a biasing force of the locking member retractor on a locking member and thereby allows a biasing force of a locking member extender to move the locking member to an extended position against an engaging surface to releasably lock connectors. The connectors transition to an unlocked state by moving the locking member retractor to move the at least one locking member to the retracted position away from the engaging surface to disengage connectors.

18 Claims, 16 Drawing Sheets

(56) References Cited

U.S. PATENT DOCUMENTS

| | | | | |
|---|---|---|---|---|
| 6,206,431 | B1 * | 3/2001 | Street | ............... F16L 37/18 |
| | | | | 285/312 |
| 6,290,267 | B1 * | 9/2001 | Swingley | ............ F16L 37/18 |
| | | | | 137/614.06 |
| 8,403,165 | B2 * | 3/2013 | DeMent | ............ F16L 55/1157 |
| | | | | 220/210 |
| 2002/0115339 | A1 | 8/2002 | Nakamura | |
| 2003/0143885 | A1 | 7/2003 | Nishide et al. | |
| 2005/0228362 | A1 | 10/2005 | Vaillancourt | |
| 2018/0066690 | A1 * | 3/2018 | Zimmer | ............ F16B 43/004 |

* cited by examiner

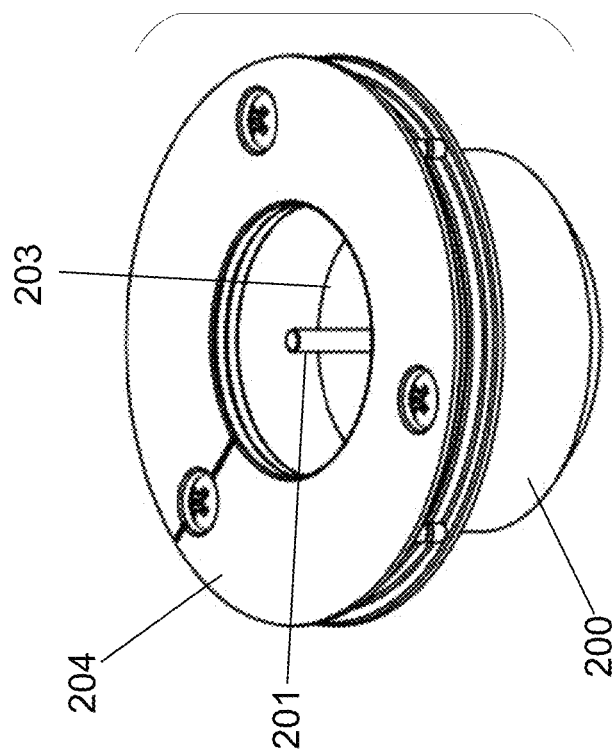
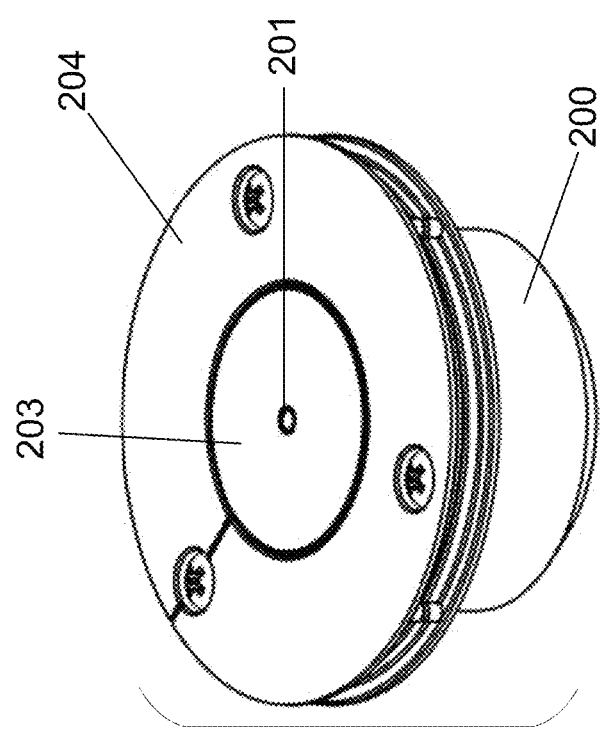
Fig. 4A
Fig. 4B

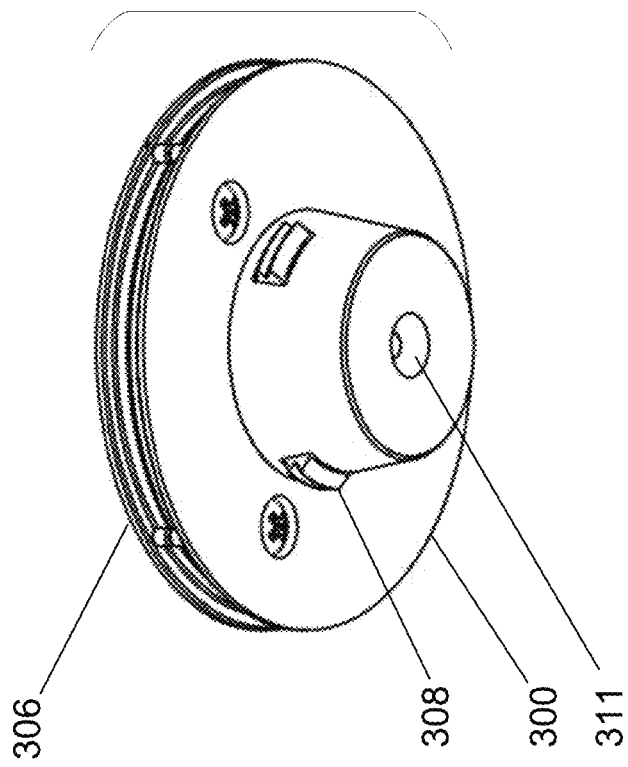
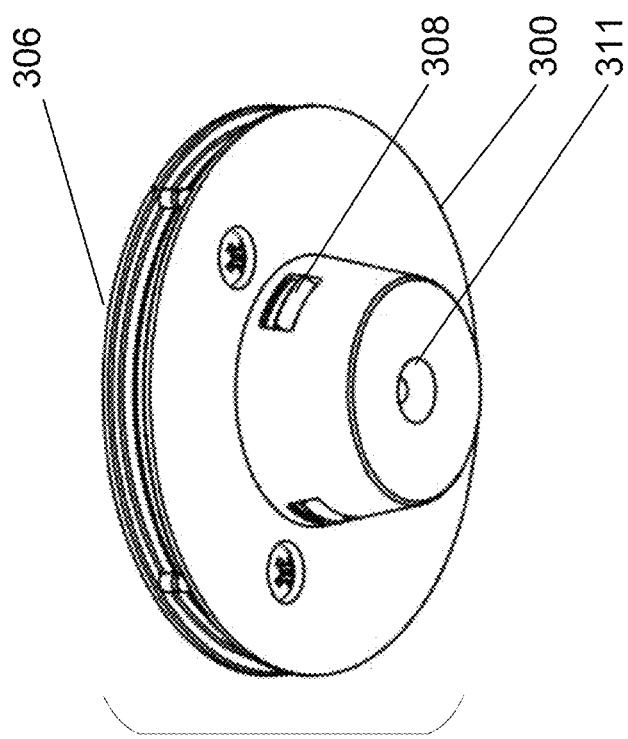
Fig. 5A
Fig. 5B

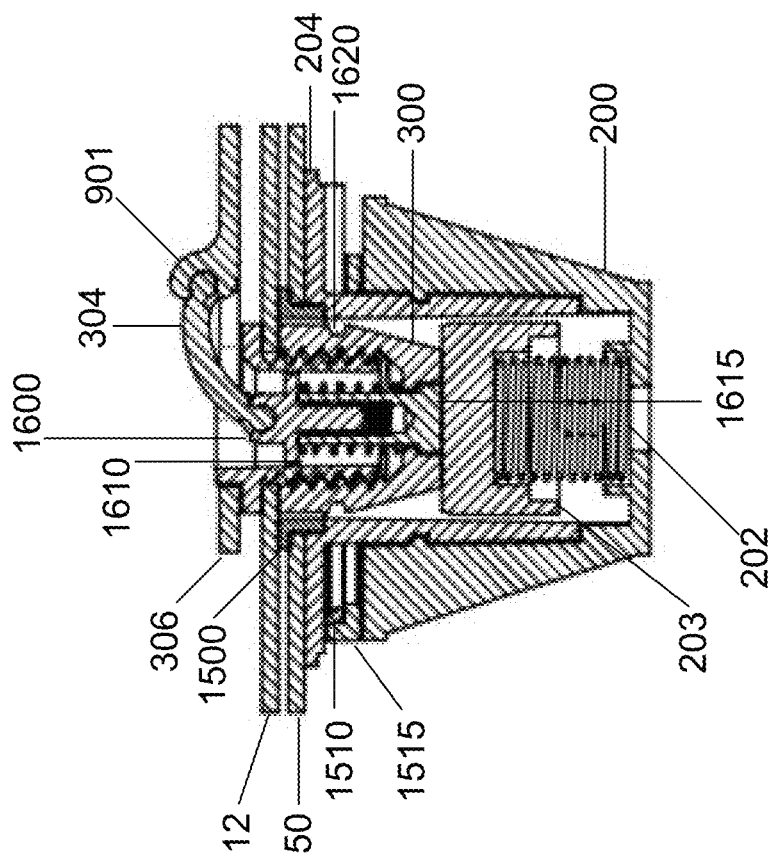
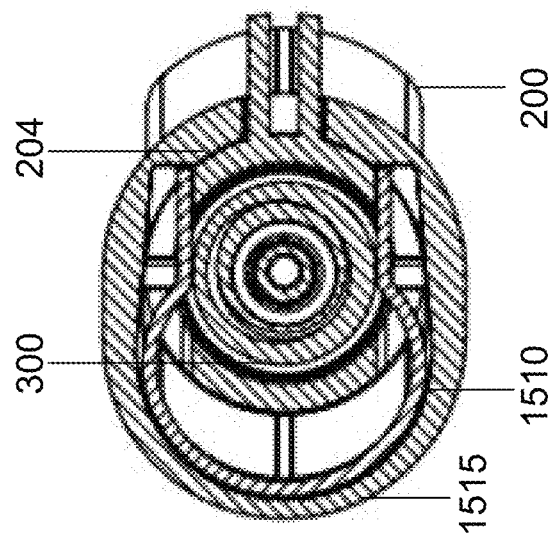
Fig. 15A
Fig. 15B

CONTAINER CONNECTION SYSTEM

CROSS REFERENCE TO RELATED APPLICATIONS

This application is a continuation-in-part of co-pending U.S. patent application Ser. No. 16/163,364, also titled "CONTAINER CONNECTION SYSTEM", filed Oct. 17, 2018, which is hereby incorporated by reference in its entirety.

FIELD OF INVENTION

This application relates to a pair of subassemblies for mechanically coupling two items together, and more specifically, for a design of one or more male connectors on a first item that are accepted securely into corresponding female connectors with a quick-release function in order to facilitate affixing and separating the two items with a minimal effort.

BACKGROUND

Many existing carryall bags (or other portable containers such as purses, makeup bags, backpacks, luggage sets, toolboxes, lunchboxes, food storage containers, etc.) are not designed with connection of multiple containers in mind. If circumstances require multiple containers to be manipulated or carried with only one hand (such as while travelling carrying an item separate from the containers), containers may either be stacked, making them vulnerable to falling over in response to a disturbance; or may be bound together by wrapping a belt around the containers completely, which takes time to fasten and unfasten, and often requires a belt not integrated into either container. Magnets can aid in fastening two items together, but are often burdened with the difficulty of being so weak that they are unable to offset the weight of a container that threatens to fall, or else so strong that disengaging the containers, once connected, requires considerable strength.

Consequently, there is a need for the ability to releasably affix two containers together quickly, to maintain that connection securely even when the containers are heavy or may have changing orientations in space over time, and to separate them easily and quickly when only one of the containers is needed.

SUMMARY OF THE INVENTION

A connector assembly for releasably connecting a first item to a second item is disclosed, comprising at least one male connector attached to the first item and at least one female connector attached to the second item. Each male connector releasably connects to a corresponding female connector, and each female connector has a recess for receiving at least a portion of a male connector. The assembly comprises at least one locking member moveable between a retracted position and an extended position, at least one locking member retractor capable of movement in a first direction, wherein movement in the first direction causes the at least one locking member to move toward the retracted position, and at least one locking member extender biasing the at least one locking member toward the extended position. The at least one male connector and the at least one female connector are releasably locked together by moving each locking member retractor to a position that reduces a biasing force of each locking member retractor on each locking member and thereby allows a biasing force of each locking member extender to move each locking member to the extended position against an engaging surface and thereby releasably lock the at least one male connector to the at least one female connector. The at least one male connector and the at least one female connector are unlocked by moving each locking member retractor to move each locking member to the retracted position away from the engaging surface.

A mechanical connector is also disclosed, comprising at least one locking member moveable between a retracted position and an extended position, a locking member retractor capable of movement in a first direction, wherein movement in the first direction causes the at least one locking member to move toward the retracted position, and at least one locking member extender biasing at least one locking member toward the extended position. The mechanical connector transitions to a releasably locked state by moving the locking member retractor to a position that reduces a biasing force of the locking member retractor on the at least one locking member and thereby allows a biasing force of the at least one locking member extender to move the at least one locking member to the extended position against an engaging surface of a mating connector to releasably lock the mechanical connector to the mating connector. The mechanical connector transitions to an unlocked state by moving the locking member retractor to move the at least one locking member to the retracted position away from the engaging surface to disengage the mechanical connector from the mating connector.

BRIEF DESCRIPTION OF THE DRAWINGS

FIGS. 4A and 4B depict an assembled female connector, both before contact with a male connector, and during locked contact with a male connector, respectively;

FIGS. 5A and 5B depict an assembled male connector, both before contact with the female connector, and during locked contact with the female connector, respectively;

FIGS. 15A and 15B depict cross-sectional views of a male and female connector after engagement and locking;

DETAILED DESCRIPTION

Figure 1B:
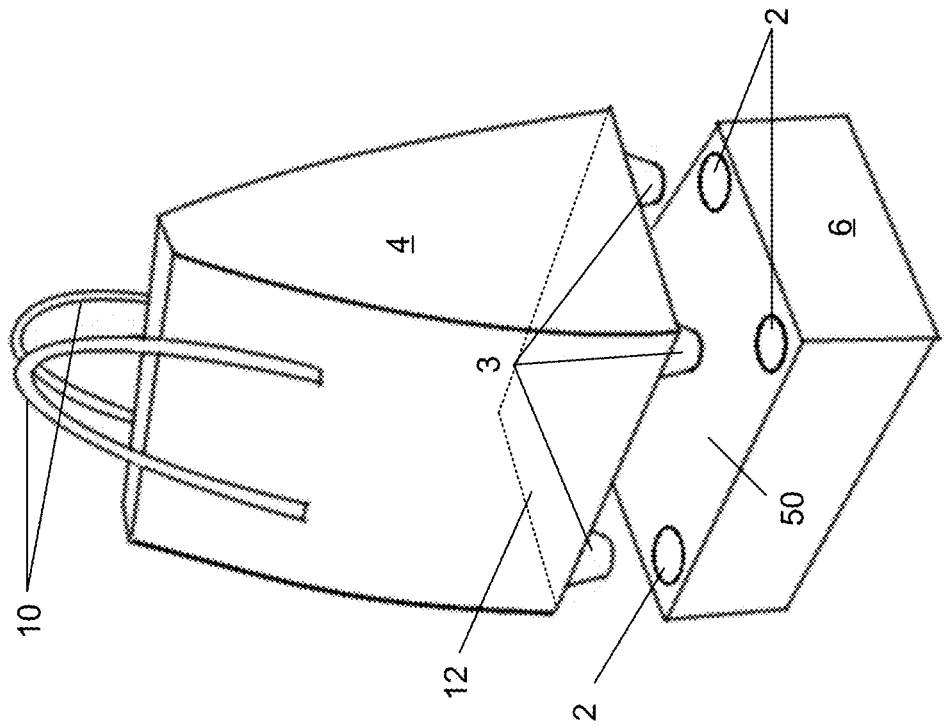
FIG. 1B depicts in simplified form, the pair of containers from FIG. 1A, including the male connectors at the base of a top container and female connectors on the upper surface of the bottom container, which releasably connect to one another according to mechanisms described in the present disclosure.
Figure 1A:
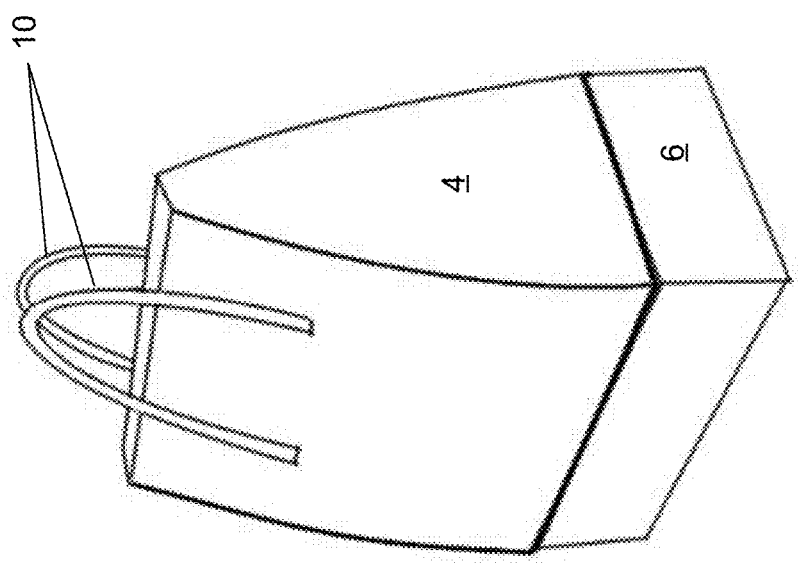
FIG. 1A depicts a representative pair of containers in a state of being affixed together to form a single unit.

FIG. 1A depicts a pair of representative containers 4, 6 in a state of being releasably affixed together to form a single unit via one or more connectors in accordance with one aspect of this disclosure.

Although containers 4, 6 are depicted in FIG. 1A and described herein as a handbag or carryall bag and as a detachable secondary bag, it is understood that the present disclosure is not limited to handbags or carryall bags, and that the containers 4, 6 may be any types of containers that are desired to releasably connected to one another. While not exhaustive, containers 4, 6 may be, by way of example only, handbags, purses, carryall bags, luggage, toolboxes, storage containers, boxes, etc., or even items that are not containers at all.

By way of example and only to describe the present disclosure, the exterior appearance of container 4 corresponds to designs for containers known in the art, including, for example, carrying strap or handles 10. The containers 4 and 6 may comprise a number of external or internal zippers, pockets, or other mechanisms (not illustrated) for opening the containers and for storing items inside.

FIG. 1B depicts, in simplified form, the pair of containers 4, 6 from FIG. 1A, incorporating one or more connectors 1, each having a male connector 3 positioned at the base of a first container 4 and a corresponding female connector 2 positioned on an upper surface of a second container 6, which releasably connect to one another in accordance with the description below.

At least one female connector 2 may be affixed to an upper surface 50 of the second container 6, corresponding to at least one male connector 3 attached to the bottom surface 12 of handbag 4. The arrangement and number of the female connectors 2 and male connectors 3 may vary according to the design of the containers or constraints that are desired to be enforced on their attachment. For example, a single female connector 2 and male connector 3 may be placed at the centers of bottom surface 12 and upper surface 50, allowing the two containers to be attached with any rotation with respect to each other. Similarly, four connectors 1 may be used in a rectangular arrangement allowing only a first relative position between the containers and a second position rotated 180 degrees from the first position. Four connectors 1 may be used in a square arrangement allowing four different relative positions, each 90 degrees rotated from another. While the containers illustrated in FIG. 1B are depicted with four male connectors 3 and four corresponding female connectors 2, it is understood that the containers may include a fewer number or a greater number of male and female connectors. More generally, any regular polygonal arrangement may be used to create a set of positions that correspond to the number of sides of the polygon (three potential relative positions for an equilateral triangle, eight for an octagon, etc.), or a polygonal arrangement lacking rotational symmetries may be used to enforce a single relative positioning (such as an isosceles triangle or trapezoid), so that only one possible alignment of the two containers can mate every male connector with every female connector.

Although references are made throughout this disclosure to "upper," "lower," "vertical," and other indications of orientation, the mechanism of mating the male connectors 3 to female connectors 2 is fundamentally independent of orientation and does not depend on gravity or any other up/down related behavior or function. Accordingly, the male connectors 3 could instead be placed on top of second container 6, while female connectors 2 could be built into the base of first container 4.

Figure 2:
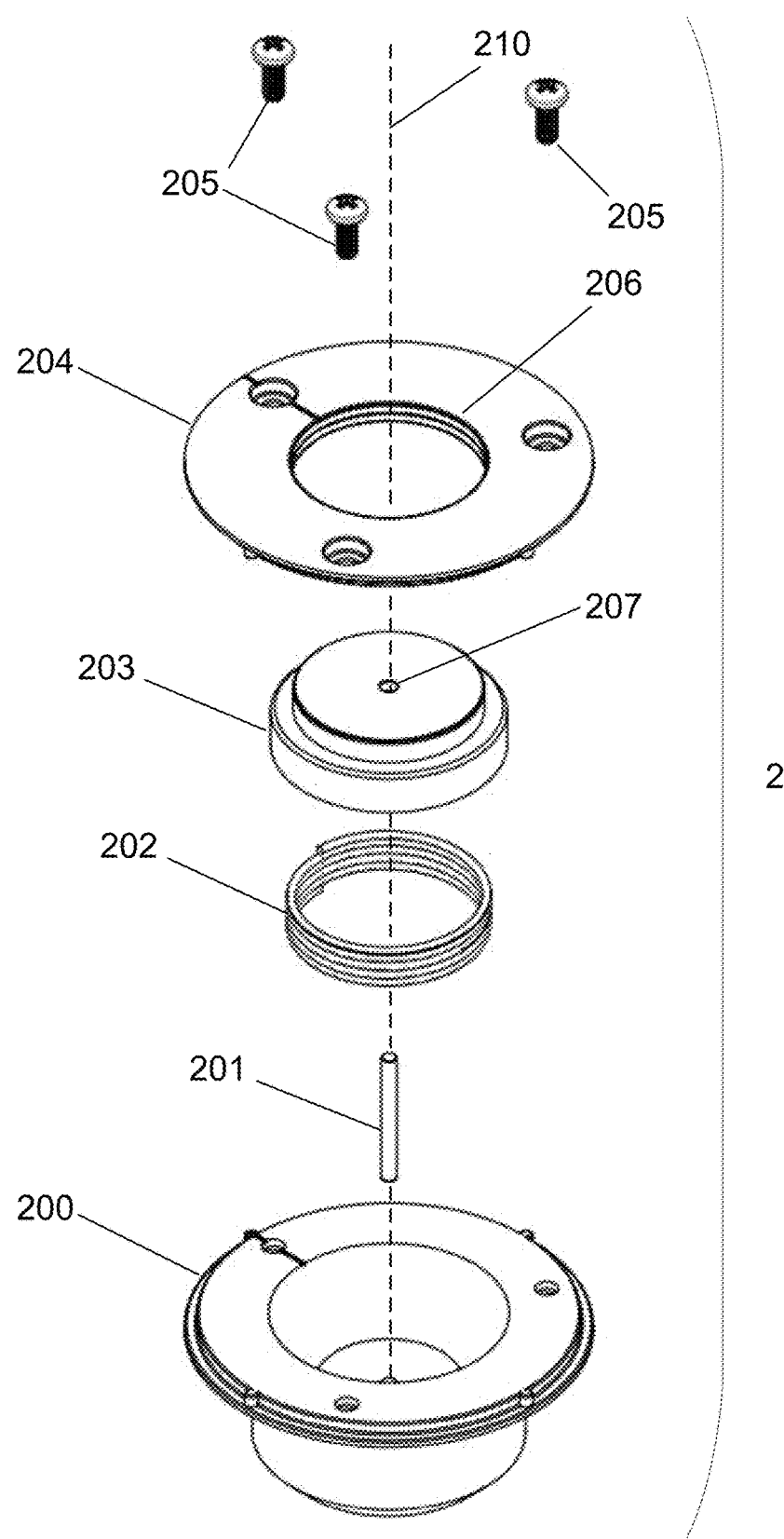
FIG. 2 depicts an exploded view of a female connector according to the present disclosure.

FIG. 2 depicts an exploded view of a female connector 2 according to the present disclosure.

In a preferred embodiment, a female connector 2 comprises a base 200, central pin 201, spring 202, panel 203, and upper face 204, such that, when assembled, their centers are all aligned along a central axis 210. One or more fasteners 205 may be used to fix base 200 to upper face 204, thereby retaining spring 202 or panel 203 between them.

Spring 202 may bias panel 203 to press upward against and flush with upper face 204 (as depicted in FIG. 4A and described below) whenever no object or force is sufficiently pressing panel 203 downward. When pressure is applied, panel 203 retracts within a cavity formed in base 200 to expose central pin 201 in a cavity formed within the female connector (as depicted in FIG. 4B and described below) through pinhole 207.

Upper face 204 may include a ridged lip 206 that passes around the inner edge of upper face 204. In some embodiments, the ridged lip 206 may only be present along parts of the inner edge where a toothed pawl (described further below) is expected to be present when the female connector 2 is properly aligned with a male connector 3.

In a preferred embodiment, the panel 203 and the inner lip of upper face 204 are circular, in order to allow engagement with a corresponding male connector 3 (described further below) regardless of how the female connector 2 and male connector 3 are rotated with respect to each other. In other embodiments, especially when the alignment of multiple male connectors 3 with multiple female connectors already constrains the positioning of the male connectors 3 and female connectors, other arbitrary shapes for the panel 203 and upper face 204 are possible, especially if a purpose is served aesthetically or with respect to other possible design constraints for the connector's use.

Figure 3:
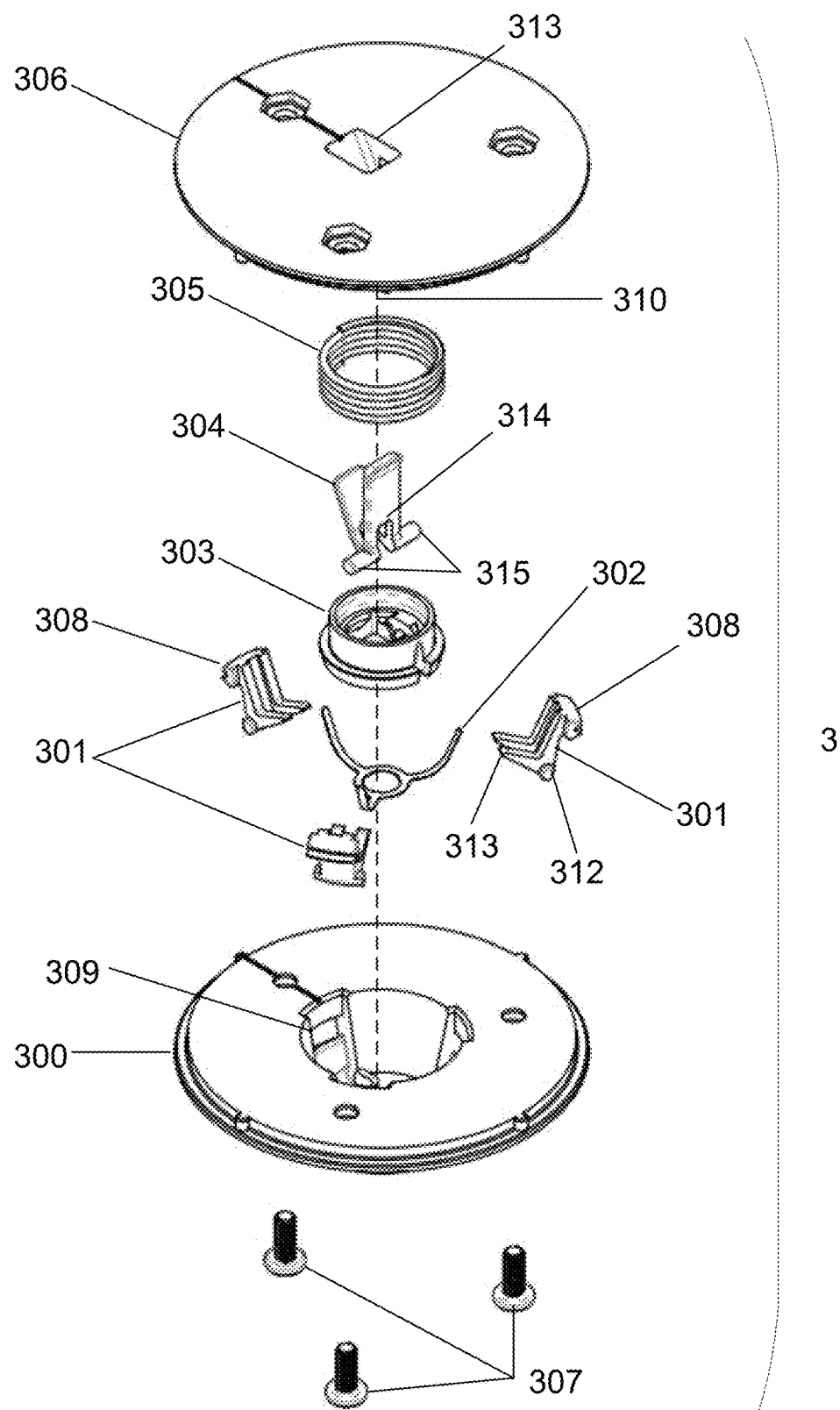
FIG. 3 depicts an exploded view of a male connector according to the present disclosure.

FIG. 3 depicts an exploded view of a male connector 3 according to the present disclosure. Each component depicted is essentially circular in shape, and has aligned centers along a central axis 310 when assembled into a single component, with the exception of the pawls 301, which are preferably placed a distance away from the central axis 310 and evenly spaced around that axis.

In a preferred embodiment, a male connector 3 includes a lower face 300, pawls 301, leaf spring 302, pawl retractor 303, tab 304, spring 305, and inner face 306. The centers of lower face 300, leaf spring 302, pawl retractor 303, spring 305, and inner face 306 may all be aligned along central axis 310, which is intended for alignment/equivalence with central axis 210 when the male connector 3 and female connector 2 are engaged. One or more fasteners 307 may be used to fix lower face 300 to inner face 306, trapping the pawls 301, leaf spring 302, pawl retractor 303, tab 304, and spring 305 between the lower face 300 and inner face 306.

In a preferred embodiment, each of the pawls 301 includes one or more teeth 308 that releasingly engage the ridges of ridged lip 206 of upper face 204 when the male connector 3 is inserted into female connector 2 to securely resist movement in the axial direction. In other embodiments, another means of engaging with a surface of the female connector 2 may be used instead of or in addition to the rigid teeth 308 shown, such as (but not limited to) a magnet oriented to attract to a respective magnet in the female connector 2, an adhesive surface, a pin that fits into a corresponding opening, a rubbery gripping surface, or any other surface or feature that would create significant resistance against another surface or feature when moved with respect to each other in the axial direction.

Lower face 300 also includes one or more pawl tooth openings or recesses 309, through which the toothed surface 308 of a corresponding pawl 301 is permitted to pass when the pawl is in an extended position, and through which the toothed surface 308 does not extend when the pawl 301 is in a retracted position.

Each pawl 301 transitions between an extended and retracted position by pivoting about a pivot point 312 that rests locked into lower face 300. The retracted position is caused when spring 305 biases the pawl retractor 303 downward along the central axis 310 to engage the rear lever 313 of the pawl 301, causing an inward rotation of the pawl about the pivot point 312 towards the central axis 310. The extended position is caused when leaf spring 302, which engages each pawl 301, is not counteracted by the pawl retractor 303 and biases the pawl 301 and its respective tooth 308 to pivot about pivot point 312 in a direction away from the central axis 310. Any other means of attempting to cause extension of the pawls 301, such as by magnets or a non-spring mechanical component, may be used, so long as the action of spring 305 and pawl retractor 303 is strong enough to overcome the force favoring extension.

Lower face 300 also includes an aperture 311 (not pictured, but present in FIGS. 5A and 5B), through which the central axis 310 passes and through which the central pin 201 of the female connector 2 is intended to pass.

In a preferred embodiment, as illustrated, each male connector 3 includes three of the pawls 301, spaced equidistant about the central axis 310 of the male connector. In other embodiments, any other number of pawls 301 might be used, such as (but not limited to) one, two, four, or more, at equidistant or arbitrary spacings about the central axis, so long as at least one pawl 301 is able to engage with ridged lip 206 of female connector 2.

Tab 304 includes a piece of flexible material, having two shoulders 315 that lock into the sides of pawl retractor 303 and allow the tab 304 to pivot along an axis through the shoulders 315 with respect to pawl retractor 303 while maintaining a connection and the ability to press pawl retractor 303 downward. Tab 304 also includes a notch 314 that corresponds to central pin 201 of female connector 2, allowing the pin to enter the notch 314 from below, but preventing further upward movement of the pin so long as the tab remains aligned along the central axis 310. In a preferred embodiment, tab 304 may have a hook or be generally "V"-shaped to stabilize one part of the tab vertically in its default position while bracing the other part of the tab against another component. As a result of the tab's flexibility, the vertical portion may be shifted off the central axis 310 by a force that is perpendicular to or at least not along the central axis. In other embodiments, the effect of the hook shape of tab 304 could be replaced by having a vertical portion only, kept in position by a lateral biasing force of a spring or other component.

In a preferred embodiment, each of the components of the male and female connectors 2, 3 are made of plastic. Other materials may be used to provide rigidity or structural support as necessary (for example, making non-deforming components such as base 200, upper face 204, lower face 300, inner face 306, central pin 201, or pawls 301 out of metal, wood, glass, enamel, bone, stone, or other exotic animal/vegetable/mineral matter) or flexibility and elasticity as necessary (for example, making spring 202, leaf spring 302, tab 304, or spring 305 out of coils or thin sheets of metal, rubber, cardboard, foam, or other materials that can be flexible while returning to their original state once force is no longer applied).

FIGS. 4A and 4B depict an assembled female connector 2, both before contact with a male connector 3, and during locked engagement with a male connector 3, respectively. In FIG. 4A, spring 202 (depicted in FIG. 2 and in FIG. 6) biases panel 203 upward against and flush with upper face 204, resulting in a default or resting appearance that is more aesthetic, safer (preventing any possible puncture by central pin 201), and cleaner (preventing detritus from entering the cavity within the female connector). In FIG. 4B, pressure applied to panel 203 (e.g., by a male connector 3 being inserted into the female connector 2) compresses spring 202 (depicted in FIG. 2 and in FIG. 6) to expose central pin 201. The retracted position is maintained so long as the male connector 3 remains inserted within the female connector 2.

FIGS. 5A and 5B depict an assembled received male connector 3, both before engagement with the female connector 2, and when releasably locked with the female connector 2, respectively.

In FIG. 5A, the male connector 3 has retracted pawls 301 whose teeth 308 do not extend beyond the pawl tooth openings 309 in the lower face 300 (shown in FIG. 3). In FIG. 5B, the male connector 3 has extended pawls 301 whose teeth 308 extend through the pawl tooth openings 309. The process of transitioning from the retracted, unlocked position to the extended, locked position is described in greater detail in FIGS. 6, 7 and 8, below.

Lower face 300 is, in a preferred embodiment, shaped so that the surface including the pawl tooth openings 309 is conical (specifically, a conical frustum) rather than cylindrical or having another shape, in order to facilitate guiding the lower face 300 into the cavity of the female connector 2 with more forgiveness for an inaccurate placing of the male connector 3. Lower face 300 also has an aperture 311 for receiving the central pin 201. In a preferred embodiment, the aperture 311 is likewise conical in order to guide the central pin 201 of female connector 2 into the aperture 311 and into male connector 3.

Figure 6:
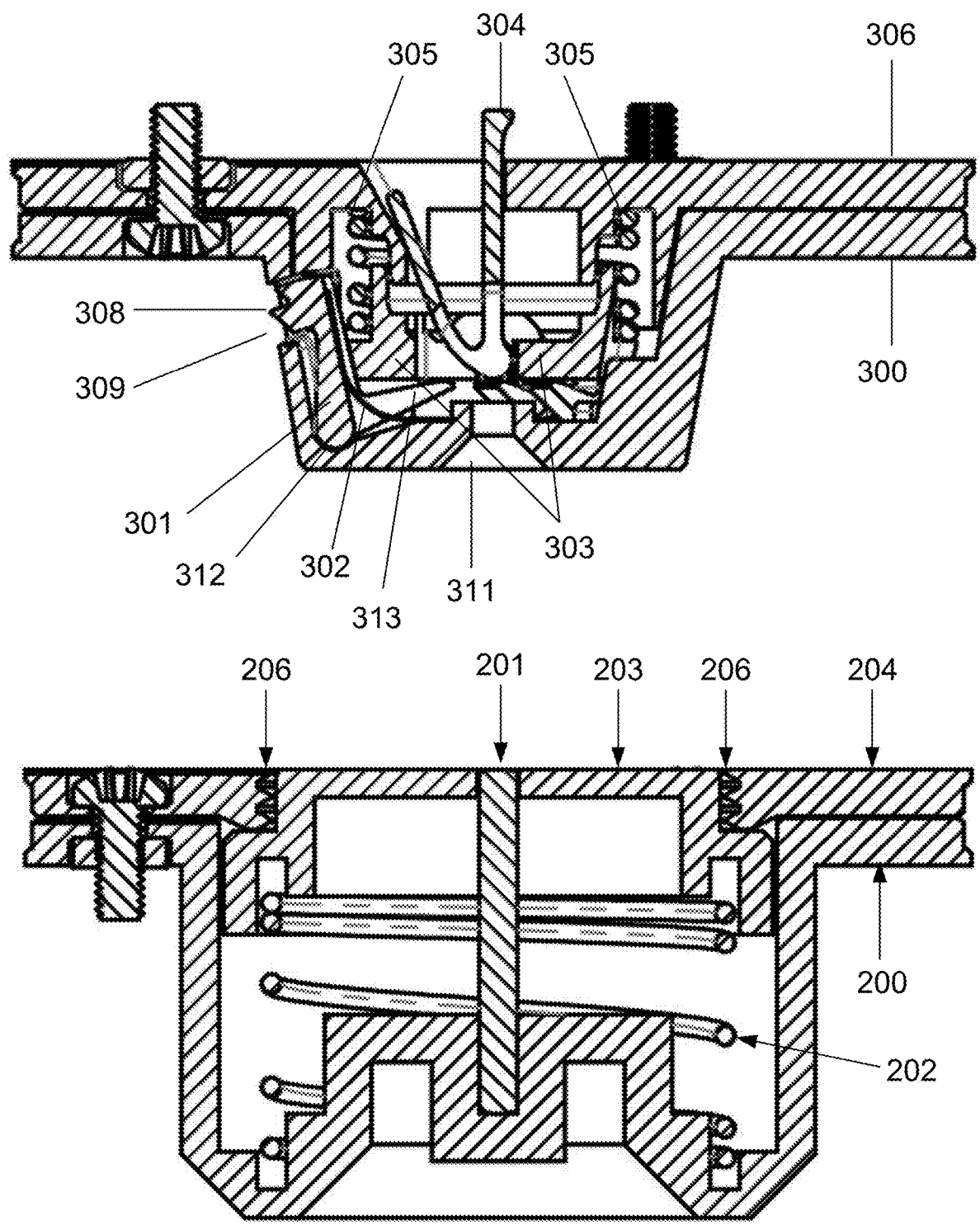
FIG. 6 depicts a cross-section of the male and the female connectors from the side, before engagement.
Figure 7:
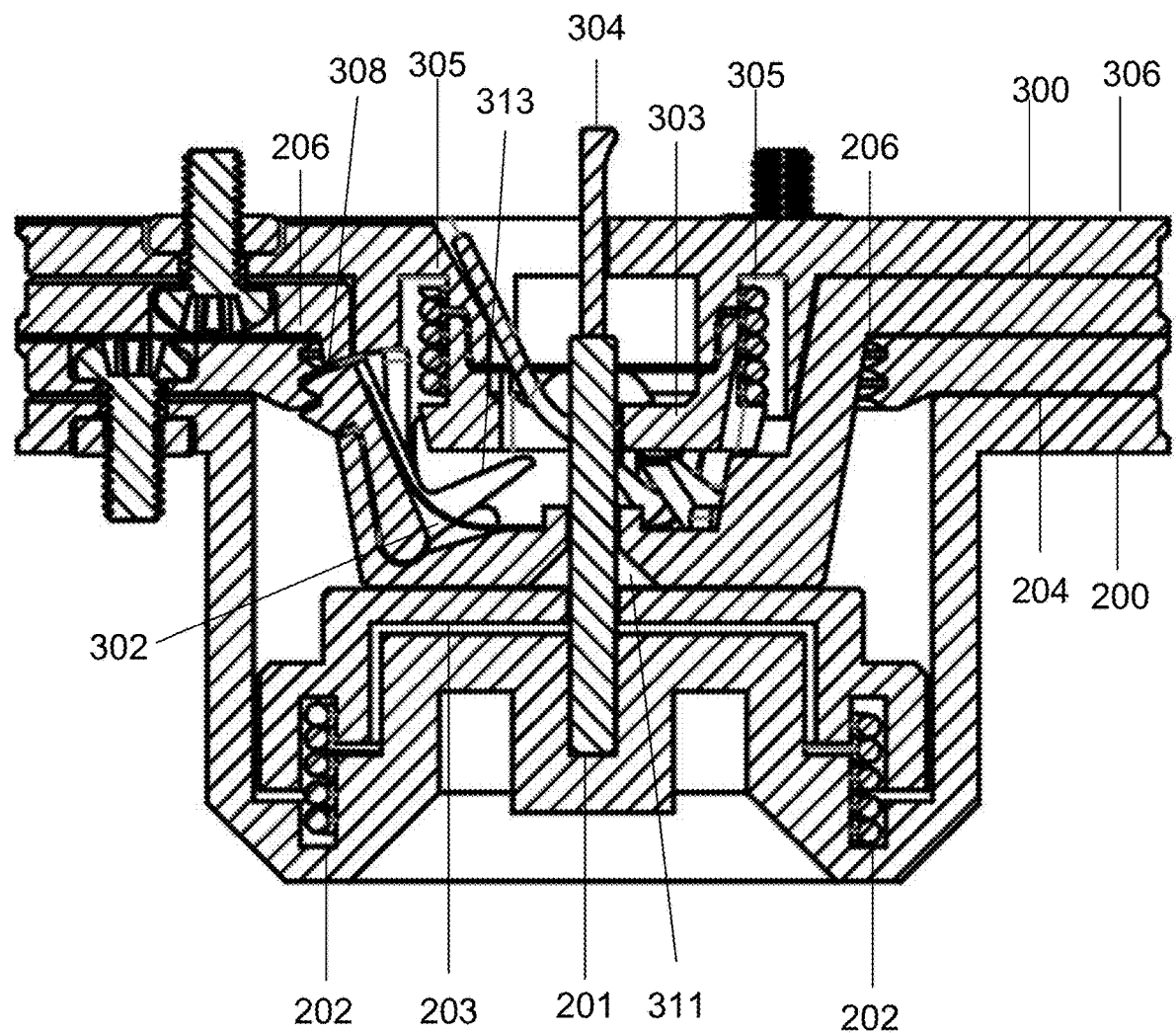
FIG. 7 depicts a cross-section of the male and the female connectors from the side, after engagement and locking.
Figure 8:
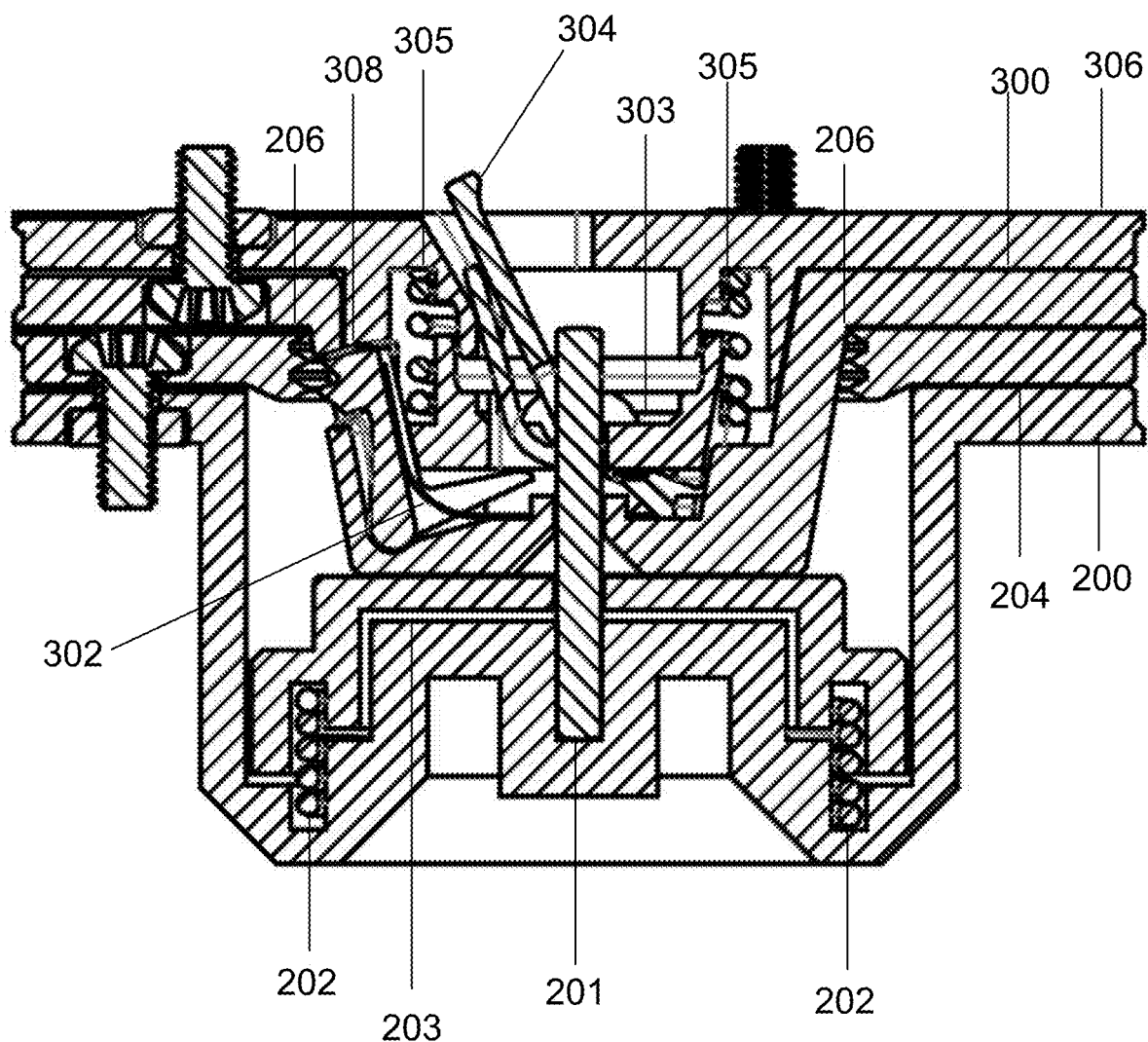
FIG. 8 depicts a cross-section of the male and the female connectors from the side, while still in physical contact but in a released state.

FIGS. 6, 7 and 8 depict cross-sections of a female connector 2 and male connector 3 from the side, in three stages of the locking and unlocking process. FIG. 6 depicts the female connector 2 and male connector 3 before engagement (corresponding to FIGS. 4A and 5A), FIG. 7 depicts them releasably locked after engagement (corresponding to FIGS. 4B and 5B), and FIG. 8 depicts them while still in physical contact but in a released, unlocked state.

In FIG. 6, tab 304 of male connector 3 extends only a small amount beyond inner face 306. Spring 305 biases pawl retractor 303 down, causing pawl retractor 303 to engage the rear lever 313 of each pawl 301. As a result, each pawl 301 remains pivoted inward about pivot point 312 such that the teeth 308 do not extend beyond the tooth opening 309.

Although leaf spring 302 may exert an outward biasing force on each pawl 301, the biasing force of spring 305 may be more powerful and/or have greater leverage on the pawl, causing the pawl to remain in its retracted position.

In FIG. 7, as the male connector 3 is inserted into the female connector 2, panel 203 of the female connector 2 is depressed by contact with lower face 300 of male connector 2, compressing spring 202. Central pin 201 is revealed and extends into aperture 311 in the lower face 300 of male connector 3. The pin 201 engages notch 314 (not pictured) of tab 304 and, unable to pass through the tab, begins to push tab 304 upward. As tab 304 moves upward, its shoulders 315 remain in locked engagement with pawl retractor 303, causing pawl retractor 303 to likewise move upward and compress spring 305. As the force supplied by the pawl retractor 303 on rear lever 313 of the pawl decreases, the biasing force of leaf spring 302 causes the teeth 308 of each pawl 301 to pivot outward to engage the ridged lip 206 and releasably lock into place, preventing movement of the male connector 3 relative to the female connector 2 in the axial direction.

Once in this locked position, the first container 4 or other item to which the male connector 3 is attached may be lifted and rotated in space and the second container 6 or other item to which the female connector 2 is attached will likewise be lifted up or rotated by the strength of the connection and the inability of the toothed pawls 301 to slip out from the ridged lip 206 of the female connector 2.

In FIG. 8, when force is applied to one terminus of tab 304 in a direction generally parallel to the inner face 306 and generally perpendicular to the central axis (in a leftward direction, in the context of FIG. 8), the other terminus remains pressed against the inside of inner face 306, and tab 304 begins to bend. As the tab 304 folds or closes in on itself, notch 314 of the tab 304 no longer remains perfectly aligned with central pin 201 of female connector 2, and eventually the tab 304 is permitted to slip to the side of central pin 201. Without the upward force supplied by central pin 201 on tab 304, the biasing force of spring 305 again presses pawl retractor 303 downward against the rear levers 313 of each pawl 301, overcoming the outward biasing force of leaf spring 302 and causing the pawl(s) 301 to pivot back into a retracted position no longer engaging the ridged lip 206 of receiver 2.

As a result, the male connector 3 is freely able to leave the female connector 2, so that the container or other item to which the male connectors 3 are attached may be lifted up after applying force to the tabs of the male connectors, leaving the container or item with the female connectors behind. Once the central pin 201 is no longer inserted into the male connector, tab 304 is able to move back into its vertical position, returning all parts to the original configuration they had in FIG. 6.

Figure 9:
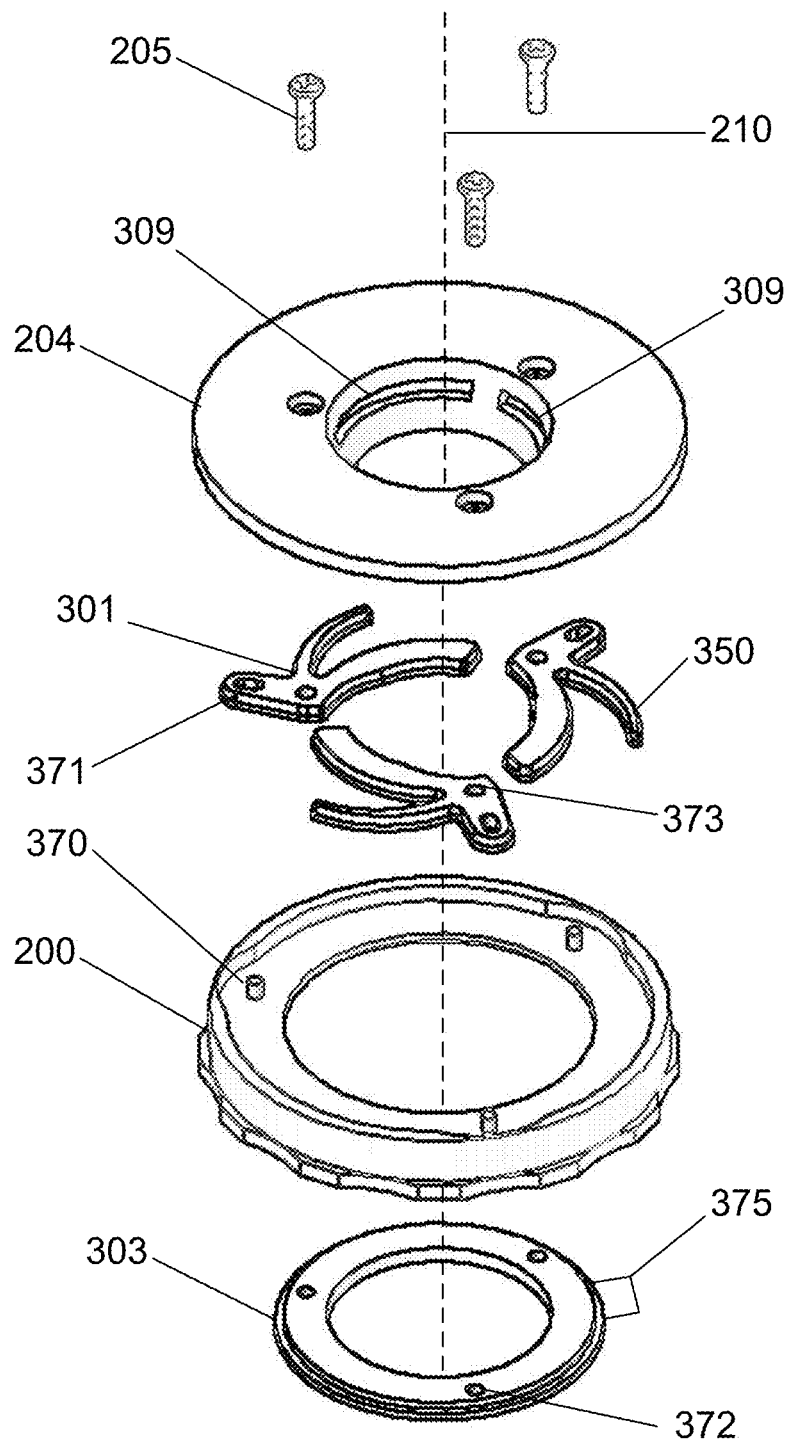
FIG. 9 depicts an exploded view of a female connector in an alternative embodiment according to the present disclosure.
Figure 10B:
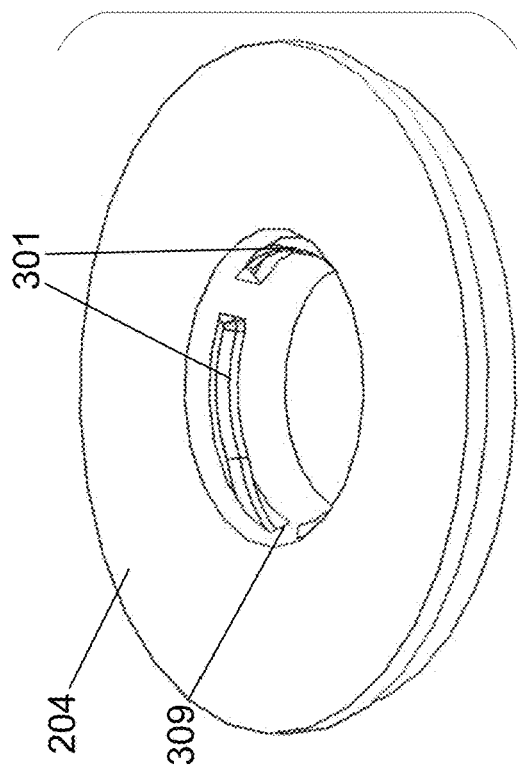
FIG. 10B depicts the assembled female connector of FIG. 9, before contact and locking with the male connector.
Figure 10A:
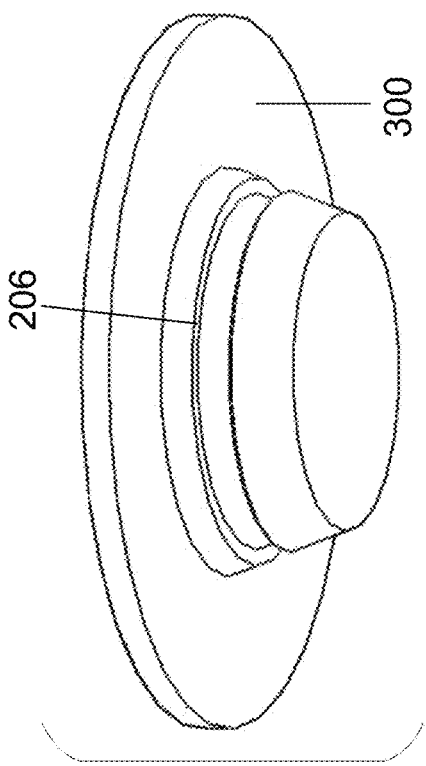
FIG. 10A depicts an assembled male connector in an alternative embodiment, before contact with the female connector of FIG. 9.

Although a specific preferred division of components between male and female connectors is described herein, different divisions of those components between parts are possible. For example, instead of a male connector that includes pawls 301 that extend outward to engage a surface of the female connector 2 in which the male connector 3 is received, an alternative embodiment could include pawls in the female connector 2 which extend inward to grab a surface of the male connector 3 (as depicted in FIGS. 9, 10A, and 10B and described below). Embodiments may use the components and interactions described here to enable either pawls that press outward from an inner connector or that press inward from an outer connector, reversing the directions of movement of the other components accordingly; for example, replacing the leaf spring 302 that presses the pawls 301 outward with a rubber band or other elastic material that biases pawls in an outer connector to pull inward and lock against an inner connector.

FIG. 9 depicts an exploded view of a female connector in an alternative embodiment according to the present disclosure.

Like the female connector 2 in the preferred embodiment depicted in FIG. 2, a female connector may include a base 200 and upper face 204 held together by one or more fasteners 205 and having a central axis 210. However, in contrast to the division of parts illustrated in FIGS. 2 and 3, the female connector 2 may include the pawls 301, pawl retractor 303, and pawl tooth openings 309.

Each pawl 301 may have two pinholes 371 and 373, corresponding to pins 370 and 372 in base 200 and pawl retractor 303, respectively. When assembled, pins 370 enter pinholes 371 and pins 372 enter pinholes 373, engaging the pawls 301 and pawl retractor 303 to the base 200. Each pawl 301 may also be made of a flexible material and have a rear-facing finger 350 that presses against the inside of the base 200, biasing the pawl 301 to pivot outward toward the central axis 210 when no countering biasing force is applied by rotating the pawl retractor 303 to pivot the pawl 301 inward.

Pawl retractor 303 may have an external tab 375, which may be pressed or pulled by an external force or component in order to cause rotation of the pawl retractor 303 and consequently movement of the one or more pawls 301.

FIG. 10A depicts an assembled male connector in an alternative embodiment, before contact with the female connector of FIG. 9.

In contrast to the male connector of the preferred embodiment, a male connector 3 may lack moving parts entirely, having only a lower face 300 and a groove or other engaging surface 206 into which the pawls 301 of the female connector 2 may releasably lock.

FIG. 10B depicts the assembled female connector of FIG. 9, before contact and locking with the male connector.

As with the male connector of the preferred embodiment, pawls 301 may pivot outward toward a central axis through pawl tooth openings 309 in upper face 204 corresponding to each pawl 301. Pivoting of the pawls 301 to an extended position or a retracted position is accomplished by rotating pawl retractor 303 with respect to base 200 and upper face 204. By rotating the pawl retractor 303, pins 372 move with respect to pins 370, causing each pawl 301 to pivot around the points at pin 370/pinhole 371. By pivoting outward (in response to a counterclockwise rotation of the pawl retractor 303 depicted in FIG. 9), the pawls may lock into groove or other engaging surface 206 of the male connector 3, preventing movement of the female connector 2 and male connector 3 with respect to one another in the axial direction. By pivoting inward (in response to a clockwise rotation of the pawl retractor 303 depicted in FIG. 9), the pawls 301 may be retracted from groove or other engaging surface 206 and into pawl tooth openings 309, allowing the male connector 3 to be removed from female connector 2.

Figure 11:
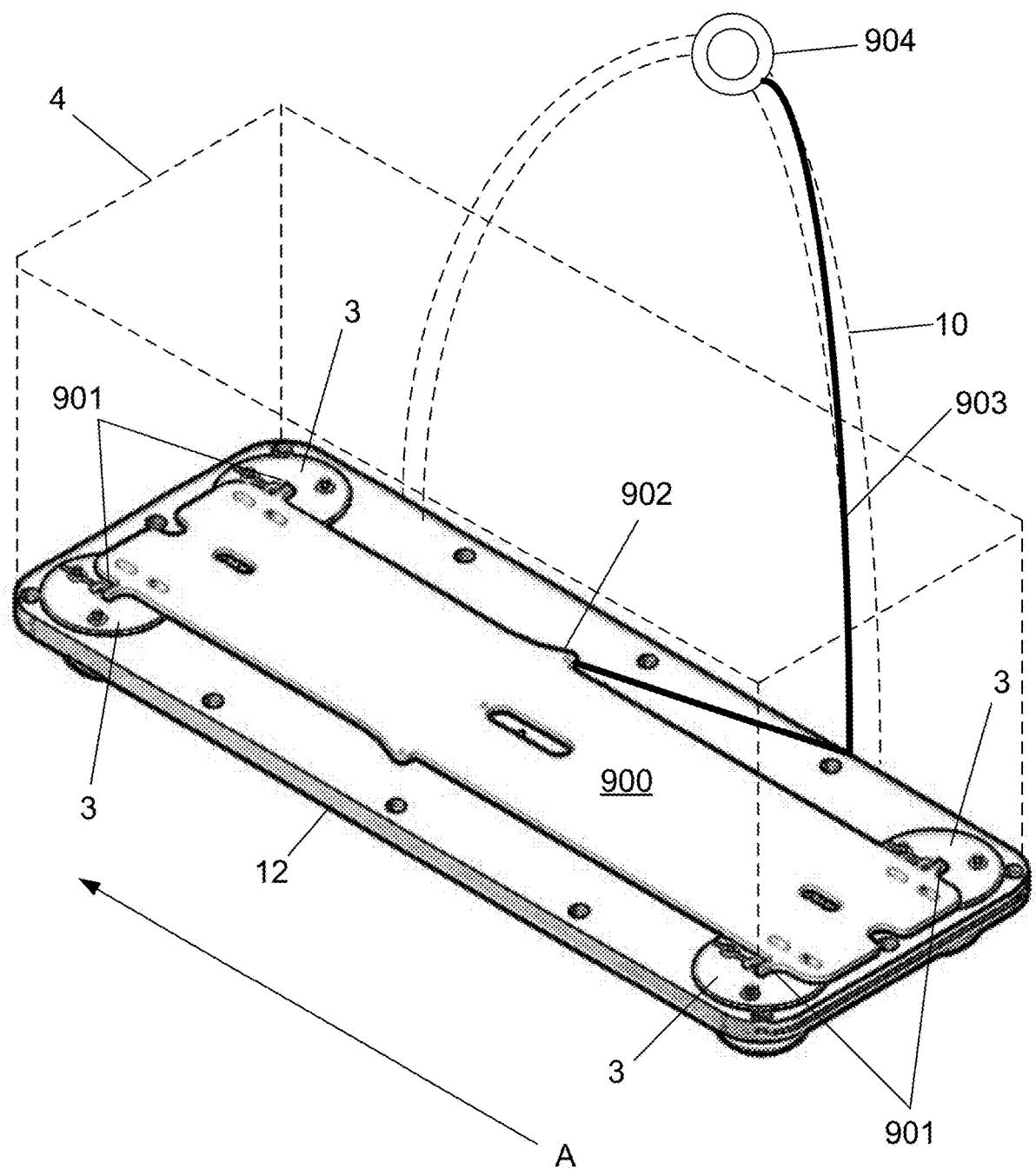
FIG. 11 depicts a button, cable, and plate assembly for triggering release of multiple connectors simultaneously.

FIG. 11 depicts a button, cable, and plate assembly that may be incorporated into a carryall bag or other container to trigger release of one or more connectors simultaneously.

A plate 900 or similar release engagement member may be embedded in or otherwise incorporated into the carryall bag or other container 4 (as originally depicted in FIG. 1). In a preferred embodiment, the plate 900 may be placed in the base of the carryall bag 4, parallel to the base, and having one or more protrusions 901, each in resting contact with a corresponding tab 304 of a male connector 3. As depicted in the context of FIG. 11, a shift of plate 900 in the direction of Arrow A by a minute amount will cause the male connectors 3 to shift into an unlocked state if they are locked, by pressing against the tabs 304 according to the method previously described. In a preferred embodiment, plate 900, as pictured, is substantially solid within the plane it occupies. In other embodiments, a scaffold, frame, or other assembly made up of only a few rods or dowels or having a much smaller area could be used instead of a plate.

Plate 900 may also comprise a number of "ears" 902 or other mounting points to which a cable 903 (or dowel, or other component or set of components capable of transmitting a pushing or pulling motion across a distance) may be attached.

In a preferred embodiment, cable 903 may be embedded within a carrying strap/handle 10 of carryall bag 4, passing through the handle to a button assembly 904 or equivalent user interface (i.e., a switch, a knob, etc.). In other embodiments, cable 903 may, instead of being embedded in a handle or strap 10, be integrated into the side, base, or other internal portion of carryall bag or other container 4 or otherwise concealed within carryall bag or other container 4.

When a user presses the button 904 (or pushes the switch, or turns the knob, etc.), a force can be transmitted along cable 903 to cause the plate 900 to move in the direction of Arrow A, causing the protrusion(s) 901 to engage the tab(s) 304 of male connectors 3 and release the carryall bag or other container 4 from the second container 6 to which it may be attached, as described in FIG. 8. Alternatively, instead of using a single cable 903 and plate 900 to engage the male connectors 3 simultaneously, multiple cables could attach from the button assembly 904 directly to each of the male connectors, each of the cables being moved when the button assembly is pressed by the user.

Further, there is no essential reason the button assembly 904, cable 903, and/or plate 900 must be in carryall bag or other container 4, as opposed to the second container 6 (referring back to FIG. 1A and FIG. 1B). A button assembly 904 in the base container may be used to disengage the top container after the connection no longer needs to be maintained. For example, if the alternative embodiment connectors of FIGS. 9, 10A, and 10B were to be used, a button in the second container 6 could cause movement of a plate or other release member 900 to engage with the tabs 375 on the pawl retractors 303 of one or more female connectors 2 in the top of the second container 6, simultaneously releasing the pawls 301 in those female connectors to release their corresponding male connectors 3, and thereby allowing container 4 to detach from second container 6.

Additionally, connectors built into a container 4 and/or second container 6 may be released by methods other than physical engagement with a pressed button. For example, the tabs 304 of the male connectors 3 may be connected to servo motors that can be triggered to press the tabs and detach the male connectors 3 in response to an electrical connection from a closed circuit or even a wirelessly transmitted signal.

In a third embodiment, depicted in FIGS. 12-16 and differing from the embodiments described in FIGS. 2-8 and 9-10, respectively, a male connector 3 may be releasably locked into a female connector 2 by means of a sliding locking member.

Figure 12:
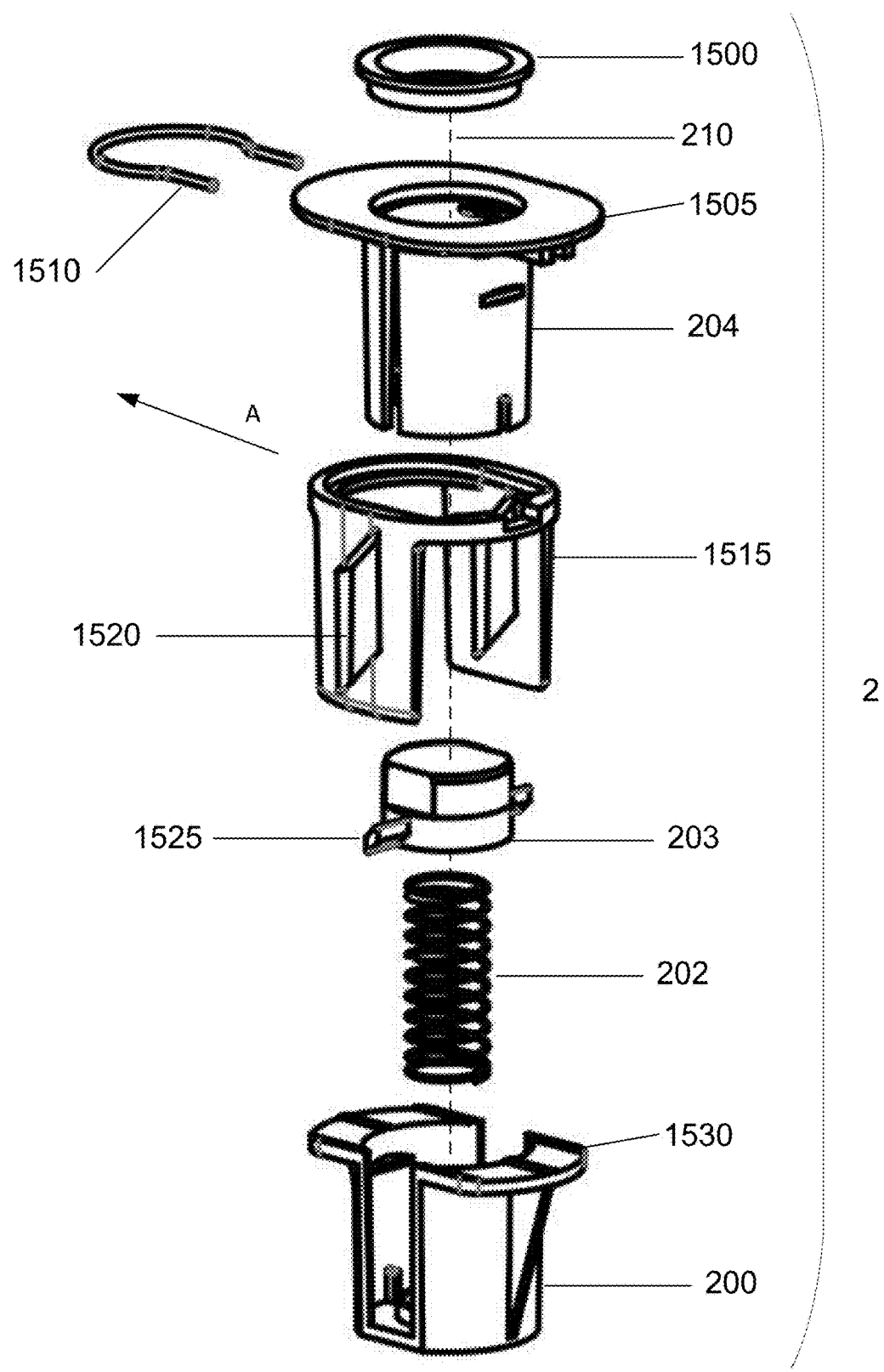
FIG. 12 depicts an exploded view of a female connector in a third, alternative embodiment.

FIG. 12 depicts an exploded view of a female connector in this third, alternative embodiment.

Like the other female connectors 2 previously described, various parts are aligned along a central axis 210.

The upper face 204 and base 200 are affixed together, with a sliding housing 1515 between the extended lips 1505 and 1530 of each. The sliding housing 1515 has an elliptical (or more accurately, a "rounded rectangle" or racetrack-like) cross-section. This cross-section allows it to move perpendicular (e.g., in the direction of Arrow A or the opposite direction) to the central axis 210 between the upper face 204 and base 200, with the round cross-section of upper face 204 itself being retained within the elliptical opening. In alternative embodiments, it is not required that these cross sections be round and elliptical, respectively; other embodiments could use square and rectangular cross-sections, or any other pairing of shapes having one dimension longer than another to allow movement of a larger shape back and forth along one axis while containing and being channeled by a smaller shape having an equal breadth along the other axis.

Sliding housing 1515 has one or more openings 1520, configured to receive tabs 1525 at the sides of a panel 203 that is biased upward by spring 202. The angled alignment of tabs 1525 and angled edges of the openings 1520 are arranged such that, when the spring 202 pushes panel 203 upward, the tabs 1525 engage with the upper edges of the openings 1520 and push the housing 1515 in the direction of Arrow A. In contrast, when panel 203 is pushed downward, compressing spring 202, the tabs 1525 engage with the bottom edges of the openings 1520 and push the housing 1515 in the direction opposite of Arrow A.

A "C"-shaped spring 1510 provides an inward-biased force that engages with a male connector when the male connector 3 is between the two tips of the spring 1510, but does not apply force when a male connector 3 is nearer the center of the spring 1510 and does not come into contact with the spring 1510.

A ring 1500 or other rivet-like connector is affixed to the rest of the female connector 2 with the upper surface 50 of the lower container 6 between them (not depicted here but in FIG. 1), fixing the female connector 2 in place with respect to the upper surface 50. As a result, only the ring 1500 and the panel 203 are visible above the upper surface, and the extended lip 1505 of upper face 204 is beneath the upper surface 50.

Figure 13:
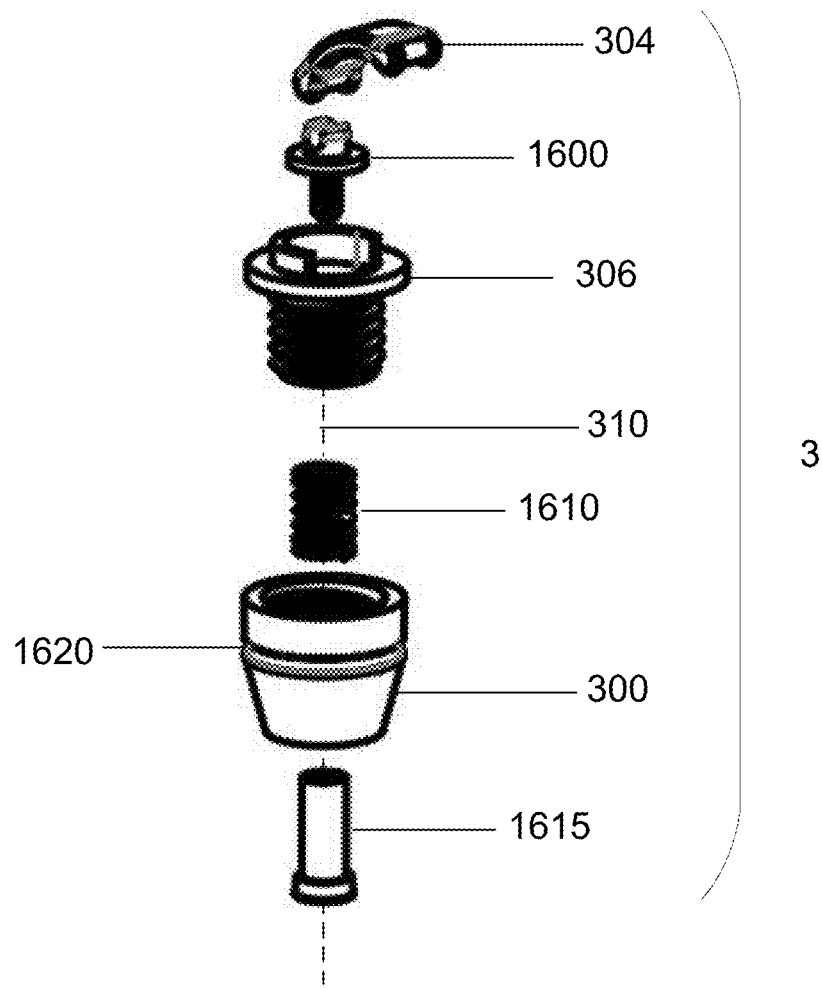
FIG. 13 depicts an exploded view of a male connector to be used in conjunction with the female connector in the third, alternative embodiment.

FIG. 13 depicts an exploded view of a male connector to be used in conjunction with the female connector in the third, alternative embodiment.

Like the other male connectors 3 previously described, various parts are aligned along a central axis 310.

Inner face 306 and lower face 300 are affixed together on either side of the lower surface 12 of the upper container 4 (not depicted here but in FIG. 1), allowing a plunger 1615 and plunger base 1600 to move freely upward and downward in a channel between them. Attached to the plunger base 1600 is a tab 304 that transforms lateral motion into a downward motion, causing the plunger base 1600 (and through its engagement with the plunger 1615, the plunger) to move downward when force is applied to tab 304.

A spring 1610 engages with and biases the plunger base 1600 upward against inner face 306. In the upward state, the plunger 1615 is flush with the bottom of lower face 300.

Lower face 300 preferably has a tapered surface to be more forgiving of misplacement when it is inserted into the female connector 2, and also has a channel 1620 of similar width to the "C"-shaped spring 1510 and into which the spring 1510 may slide laterally.

Figure 14B:
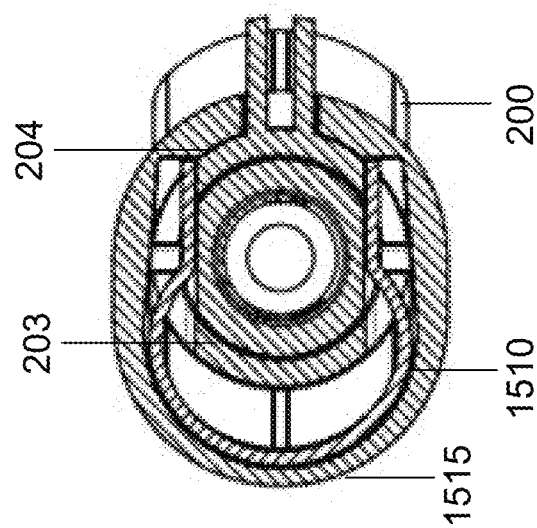
FIGS. 14A and 14B depict cross-sectional views of a male and female connector prior to engagement.
Figure 14A:
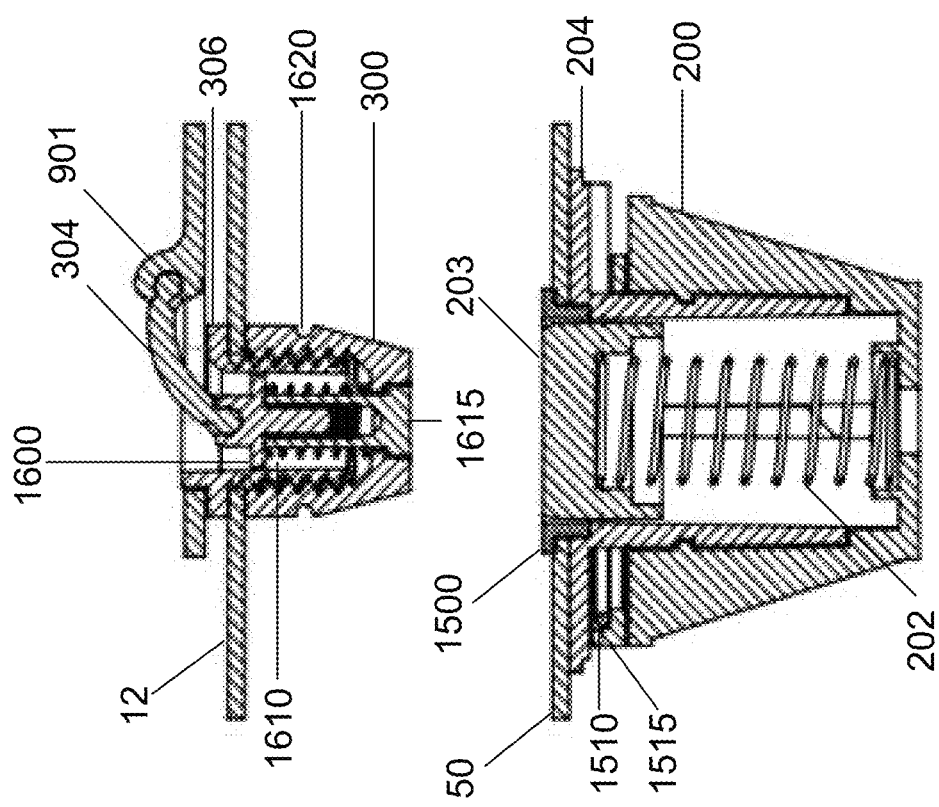

FIG. 14A depicts a cross-sectional view of a male and female connector prior to engagement.

Before engagement, panel 203 is fully extended upward by the biasing action of spring 202, flush with ring 1500. The housing 1515 and "C"-shaped spring 1510 are fully to the left and aligned with the outer left edge of base 200. The spring 1610 is fully retracting the plunger base 1600 and plunger 1615 so that the plunger 1615 does not extend beyond lower face 300.

FIG. 14B depicts the same moment with a cross-section perpendicular to the central axis 210 and passing through the "C"-shaped spring 1510 and the housing 1515.

Prior to engagement, the spring 1510 and the housing 1515 are aligned fully to the left, so that the tips of the spring 1510 are centered on the panel 203 and ready to grasp anything that pushes the panel 203 out of the way.

FIG. 15A depicts cross-sectional views of a male and female connector after engagement and locking.

After engagement, panel 203 is partially depressed by the force of lower face 300. The housing 1515 and "C"-shaped spring 1510 are still fully to the left and aligned with the outer left edge of base 200, but now, the spring 1510 is aligned with and has tips within the channel 1620, locking the male connector in place and preventing withdrawal. The plunger base 1600 and plunger 1615 remain fully retracted within lower face 300.

FIG. 15B depicts the same moment with a cross-section perpendicular to the central axis 210 and passing through the "C"-shaped spring 1510 and the housing 1515.

As mentioned above, the tips of the spring 1510 now are able to fit into the channel 1620 of lower face 300, locking the male connector in place.

Figure 16B:
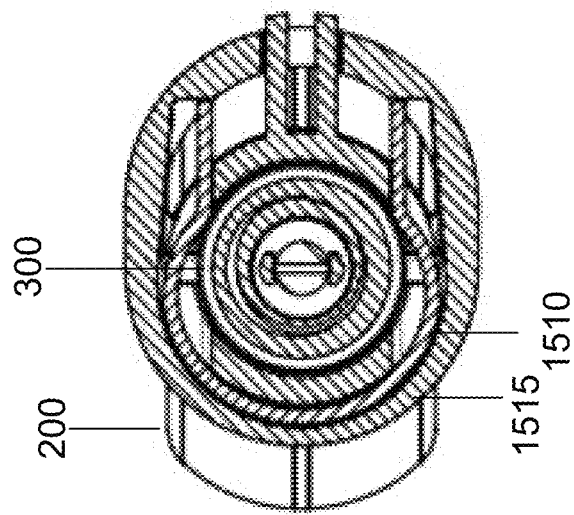
FIGS. 16A and 16B depict cross-sectional views of a male and female connector while still in physical contact but in the process of being unlocked.
Figure 16A:
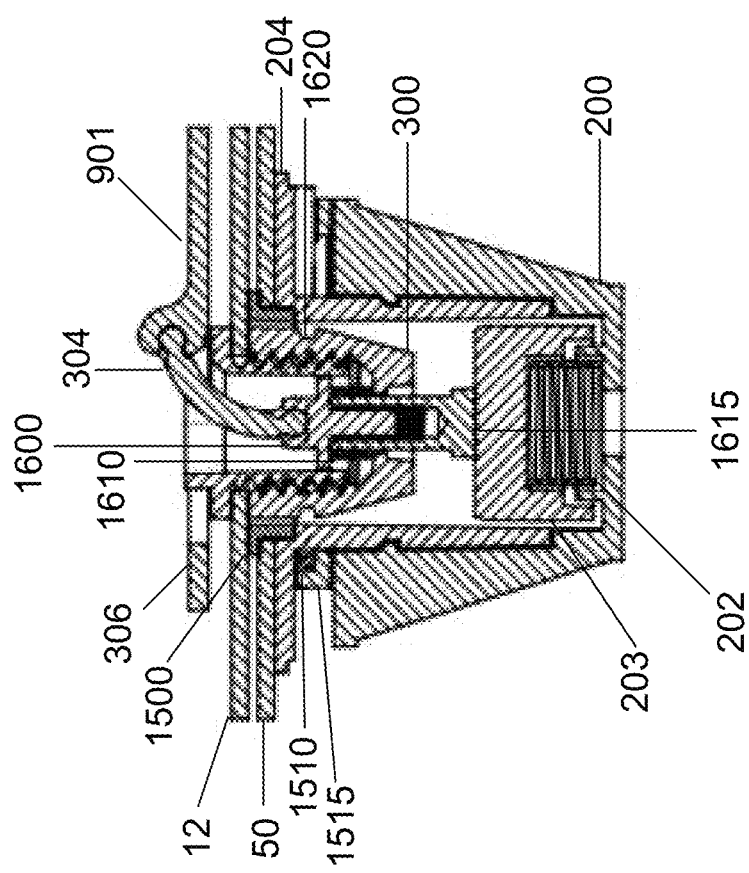

FIG. 16A depicts cross-sectional views of a male and female connector while still in physical contact but in the process of being unlocked.

When a force is applied to the tab 304 (for example, by the engaging protrusion 901 also depicted in FIG. 11), the tab 304 overcomes the biasing force of the spring 1610 and presses the plunger base 1600 and plunger 1615 downward against the panel 203. When the panel 203 is fully depressed, its tabs 1525 (not pictured) engage with the openings 1520 in the sliding housing 1515. As a result, the sliding housing 1515 slides fully to the right, as depicted, aligned with the outer right edge of base 200. Sliding housing 1515 causes "C"-shaped spring 1510 to also move fully to the right, sliding the tips of the spring out of the channel 1620 so that lower face 300 is no longer locked in place.

FIG. 16B depicts the same moment with a cross-section perpendicular to the central axis 210 and passing through the "C"-shaped spring 1510 and the housing 1515.

As mentioned above, the tips of the spring 1510 no longer engage with the outer surface of lower face 300, allowing retraction of the male connector.

Although the various embodiments of the presently described connection system are useful for connecting two portable containers, the connectors may be used in a variety of applications. For example, in another embodiment, a female connector may be embedded in a dog's collar and a male connector placed at the end of a leash, with a cable embedded along the length of the leash, such that a handle held by a person walking the dog can allow the person to release the collar from the leash at a distance of one or more meters without needing to bend down and deal with the dog directly. Similarly, connections according to the present disclosure could be used to securely and quickly affix an item in place for safety reasons, such as installing a child safety seat in a car or replacing a carabiner in a rock climbing activity.

Connectors of the form illustrated and described above may be used generally for mounting items to walls, ceilings, or floors. For example, power tools in a workshop could each have a male connector allowing them to be stored on the wall (via female connectors integrated into the wall) when not in use. Connectors could be used to releasably mount televisions on walls, hang fixtures from ceilings, or attach furniture to the ground in a semi-permanent manner that can be disengaged if necessary to temporarily move the item. Further, since the components can mostly be made of metal rather than requiring strictly plastic or other materials, an electrical connection could be formed through a connector, allowing, for example, a portable light fixture having a male connector to be attached to any one of a number of ceiling or wall female connectors supplied with electrical current, creating a socket from which a light cannot be unplugged except by intentional disengagement and release of the male connector.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A connector assembly for releasably connecting a first item to a second item, comprising:
    at least one male connector attached to the first item and at least one female connector attached to the second item, each male connector releasably connecting to a corresponding female connector, and each female connector having a recess for receiving at least a portion of a male connector;
    at least one locking member moveable between a retracted position and an extended position, wherein the locking member comprises one or more angled openings along which tabs move to exert force on the locking member to move into the retracted position or the extended position,
    at least one locking member retractor capable of movement in a first direction, wherein movement in the first direction causes the at least one locking member to move toward the retracted position, and
    at least one locking member extender biasing the at least one locking member toward the extended position;
    wherein the at least one male connector and the at least one female connector are releasably locked together by moving each locking member retractor to a position that reduces a biasing force of each locking member retractor on each locking member and thereby allows a biasing force of each locking member extender to move each locking member to the extended position against an engaging surface and thereby releasably lock the at least one male connector to the at least one female connector; and
    wherein the at least one male connector and the at least one female connector are unlocked by moving each locking member retractor to move each locking member to the retracted position away from the engaging surface.

2. The connector assembly of claim 1, wherein the tabs are each connected to a panel that moves along a central axis of one of the at least one female connectors.

3. The connector assembly of claim 2, wherein the panel is biased in a second direction opposite the first direction by the locking member extender.

4. The connector assembly of claim 3, wherein the locking member retractor comprises a plunger that depresses the panel and thereby forces the locking member into the retracted position.

5. The connector assembly of claim 1, wherein engagement of the tabs with the one or more angled openings causes movement of the locking member perpendicular to a central axis of the at least one female connector.

6. The connector assembly of claim 1, wherein each locking member and each locking member extender are comprised within the at least one female connector.

7. The connector assembly of claim 1, where each locking member retractor is comprised within the at least one male connector.

8. The connector assembly of claim 1, wherein the at least one locking member comprises a C-spring in each of the at last one female connectors for grasping a corresponding male connector.

9. The connector assembly of claim 8, wherein the at least one male connector has a groove into which the C-spring of each of the at least one female connectors is securely fastened to prevent movement of the at least one male connector perpendicular to the groove.

10. The connector assembly of claim 8, wherein retraction of the locking member by the locking member retractor causes the C-spring to be pulled away from contact with the male connector and unlock the male connector.

11. A mechanical connector, comprising:
    at least one locking member moveable between a retracted position and an extended position, wherein the locking member comprises one or more angled openings along which tabs move to exert force on the locking member to move into the retracted position or the extended position,
    a locking member retractor capable of movement in a first direction, wherein movement in the first direction causes the at least one locking member to move toward the retracted position, and
    at least one locking member extender biasing at least one locking member toward the extended position;
    wherein the mechanical connector transitions to a releasably locked state by moving the locking member retractor to a position that reduces a biasing force of the locking member retractor on the at least one locking member and thereby allows a biasing force of the at least one locking member extender to move the at least one locking member to the extended position against an engaging surface of a mating connector to releasably lock the mechanical connector to the mating connector; and
    wherein the mechanical connector transitions to an unlocked state by moving the locking member retractor to move the at least one locking member to the retracted position away from the engaging surface to disengage the mechanical connector from the mating connector.

12. The mechanical connector of claim 11, wherein the tabs are each connected to a panel that moves along a central axis of the mechanical connector.

13. The mechanical connector of claim 12, wherein the panel is biased in a second direction opposite the first direction by the locking member extender.

14. The mechanical connector of claim 13, wherein the locking member retractor comprises a plunger that depresses the panel and thereby forces the locking member into the retracted position.

15. The mechanical connector of claim 11, wherein engagement of the tabs with the one or more angled openings causes movement of the locking member perpendicular to a central axis of the mechanical connector.

16. The mechanical connector of claim 11, wherein the at least one locking member comprises a C-spring for grasping the engaging surface.

17. The mechanical connector of claim 16, wherein the engaging surface has a groove into which the C-spring is securely fastened to prevent movement of the engaging surface perpendicular to the groove.

18. The mechanical connector of claim 16, wherein retraction of the locking member by the locking member retractor causes the C-spring to be pulled away from contact with the engaging surface and unlock the mechanical connector.

* * * * *